United States Patent
Venkataraman et al.

(10) Patent No.: US 10,140,444 B2
(45) Date of Patent: Nov. 27, 2018

(54) METHODS AND SYSTEMS FOR DYNAMICALLY MANAGING ACCESS TO DEVICES FOR RESOLUTION OF AN INCIDENT TICKET

(71) Applicant: Wipro Limited, Bangalore (IN)

(72) Inventors: Arthi Venkataraman, Bangalore (IN); Ramkumar Balasubramanian, Bangalore (IN)

(73) Assignee: WIPRO LIMITED, Bangalore (IN)

(*) Notice: Subject to any disclaimer, the term of this patent is extended or adjusted under 35 U.S.C. 154(b) by 194 days.

(21) Appl. No.: 15/086,828

(22) Filed: Mar. 31, 2016

(65) Prior Publication Data
US 2017/0262621 A1  Sep. 14, 2017

(30) Foreign Application Priority Data
Mar. 11, 2016  (IN) .............................. 201641008523

(51) Int. Cl.
*H04L 29/06* (2006.01)
*G06F 21/33* (2013.01)
(Continued)

(52) U.S. Cl.
CPC .......... *G06F 21/335* (2013.01); *G06F 21/604* (2013.01); *G06F 21/6218* (2013.01);
(Continued)

(58) Field of Classification Search
CPC ................ G06F 21/335; G06F 21/604; G06F 2221/2141; G06F 2221/2101
See application file for complete search history.

(56) References Cited

U.S. PATENT DOCUMENTS 5,649,182 A * 7/1997 Reitz ................. G06F 17/30867
6,219,648 B1 * 4/2001 Jones ............... G06Q 10/06311
                                                              340/506
(Continued)

FOREIGN PATENT DOCUMENTS

EP  2 426 888  3/2012

OTHER PUBLICATIONS

European Search Report dated Jan. 30, 2017 in counterpart European Patent Application No. 161772447.7, 15 pages.

*Primary Examiner* — Morshed Mehedi
(74) *Attorney, Agent, or Firm* — Finnegan, Henderson, Farabow, Garrett & Dunner, LLP (57) ABSTRACT

In one embodiment, an access management system for dynamically managing access to one or more devices for resolution of an incident ticket associated with the one or more devices is disclosed. The access management system comprises a processor and a memory communicatively coupled to the processor. The memory stores processor instructions, which, on execution, causes the processor to identify an incident ticket type by analyzing data associated with the incident ticket. The processor is caused to determine one or more access parameters based on the incident ticket type. The one or more access parameters comprises a device type, an application software run on a device, a system software run on a device, a security privilege to access the device, and time duration to access the device. Further, the processor is caused to provide the access to the one or more devices based on the one or more access parameters.

14 Claims, 3 Drawing Sheets

(51) Int. Cl.
*G06F 21/60* (2013.01)
*H04L 12/24* (2006.01)
*G06F 21/62* (2013.01)
*G06Q 10/06* (2012.01)

(52) U.S. Cl.
CPC ......... *G06Q 10/06* (2013.01); *H04L 41/5074* (2013.01); *H04L 63/10* (2013.01); *G06F 2221/2101* (2013.01); *G06F 2221/2137* (2013.01); *G06F 2221/2141* (2013.01)

(56) References Cited

U.S. PATENT DOCUMENTS

| | | |
|---|---|---|
| 8,185,550 B1 | 5/2012 | Eichler et al. |
| 8,738,414 B1 | 5/2014 | Nagar et al. |
| 8,826,403 B2 | 9/2014 | Bhaskaran et al. |
| 2004/0120250 A1* | 6/2004 | Langevin ............ H04L 41/0213 370/216 |
| 2010/0010848 A1* | 1/2010 | Marchman ............. G06Q 10/06 705/7.12 |
| 2012/0005131 A1 | 1/2012 | Horvitz et al. |
| 2012/0060163 A1* | 3/2012 | Khan .................... H04L 63/105 718/103 |
| 2013/0090976 A1* | 4/2013 | White .................... G06Q 10/20 705/7.27 |
| 2015/0186830 A1 | 7/2015 | Dossing |
| 2015/0220864 A1 | 8/2015 | Karande et al. |
| 2015/0261956 A1 | 9/2015 | Anderson et al. |
| 2015/0356488 A1 | 12/2015 | Eden et al. |

\* cited by examiner

METHODS AND SYSTEMS FOR DYNAMICALLY MANAGING ACCESS TO DEVICES FOR RESOLUTION OF AN INCIDENT TICKET

TECHNICAL FIELD

This disclosure relates generally to incident management, and more particularly to methods and systems for dynamically managing access to devices for resolution of an incident ticket.

BACKGROUND

In certain scenarios, resolution of incident tickets includes performing actions on devices or systems. For example, the actions may include modifying proxy settings, installing software, updating software, or the like. In order to perform the actions, an agent requires remote access to the devices for a specific time duration.

The existing methods configure the access to the devices manually. Also, the existing methods fail to provide information in advance about software applications or system applications in the devices which are required to be accessed for resolution of the incident ticket. Moreover, a privilege level at which the access is to be provided or duration of time for which access is to be provided for resolution of the incident ticket is not known in advance. Therefore, the existing methods provide the access to the devices to respective agents in a pre-configured and fixed manner.

Due to static configuration of access to the devices, multiple security issues may arise as the access is provided to the device rather than providing access to specific software applications or system applications in the device. In addition, an agent assigned for the resolution of the incident ticket may be provided access at a higher security privilege than required resulting in security or confidentiality breach. As the access is provided for complete or -pre-configured duration of time, the agent may be given access for an extra time than required for the resolution of the incident ticket. On the other hand, if the resolution of the incident ticket requires additional time, then the agent may be denied access permissions during the resolution, thereby causing delay in the resolution of the incident ticket.

SUMMARY

In one embodiment, a method for dynamically managing access to one or more devices for resolution of an incident ticket associated with the one or more devices is disclosed. The method comprises identifying, by an access management system, an incident ticket type by analyzing data associated with the incident ticket. Further the method comprises determining, by the access management system, one or more access parameters based on the incident ticket type. The one or more access parameters comprises at least one of a device type, an application software run on a device, a system software run on a device, a security privilege to access the device, and time duration to access the device. The method comprises providing, by the access management system, the access to the one or more devices based on the one or more access parameters for the resolution of the incident ticket.

In one embodiment, an access management system for dynamically managing access to one or more devices for resolution of an incident ticket associated with the one or more devices is disclosed. The access management system comprises a processor and a memory communicatively coupled to the processor. The memory stores processor instructions, which, on execution, causes the processor to identify an incident ticket type by analyzing data associated with the incident ticket. The processor is caused to determine one or more access parameters based on the incident ticket type. The one or more access parameters comprises at least one of a device type, an application software run on a device, a system software run on a device, a security privilege to access the device, and time duration to access the device. Further, the processor is caused to provide the access to the one or more devices based on the one or more access parameters for the resolution of the incident ticket.

In one embodiment, a non-transitory computer-readable medium is disclosed, storing instructions executable by a hardware processor to perform a method. The method may include identifying, via the hardware processor, an incident ticket type by analyzing data associated with the incident ticket. The method may also include determining, via the hardware processor, one or more access parameters based on the incident ticket type, wherein the one or more access parameters comprises at least one of a device type, an application software run on a device, a system software run on a device, a security privilege to access the device, and time duration to access the device and providing, via the hardware processor, the access to the one or more devices based on the one or more access parameters for the resolution of the incident ticket.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses systems and methods for dynamically managing access to one or more devices for resolution of an incident ticket associated with the one or more devices. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Figure 1:
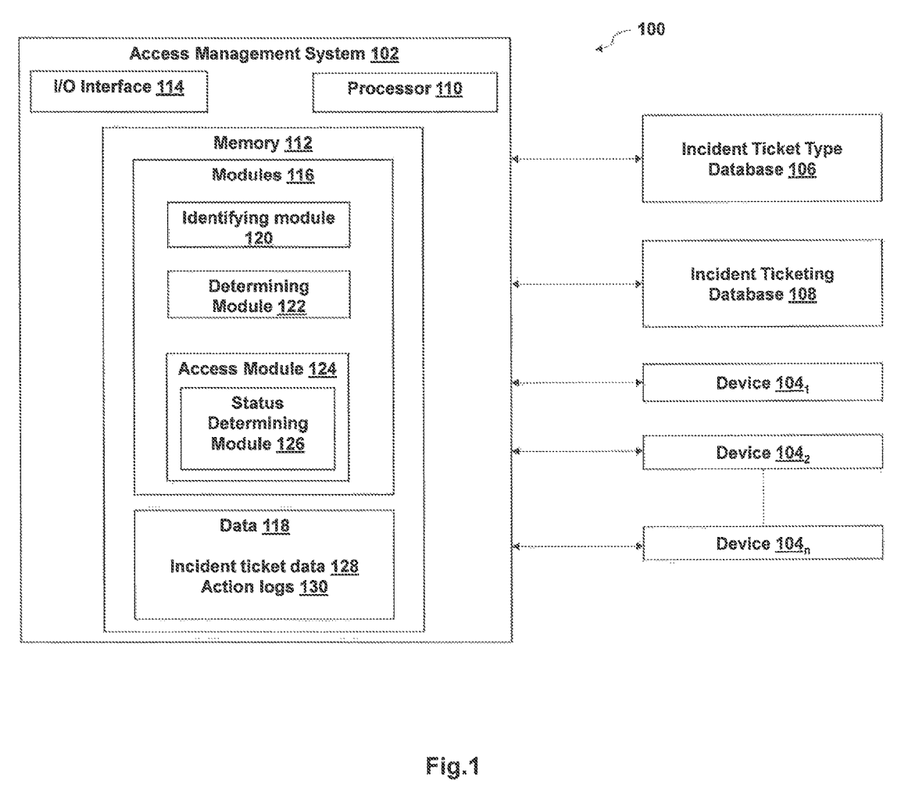
FIG. 1 illustrates an exemplary network implementation comprising an access management system for dynamically managing access to one or more devices for resolution of an incident ticket associated with the one or more devices, according to some embodiments of the present disclosure.
Figure 2:
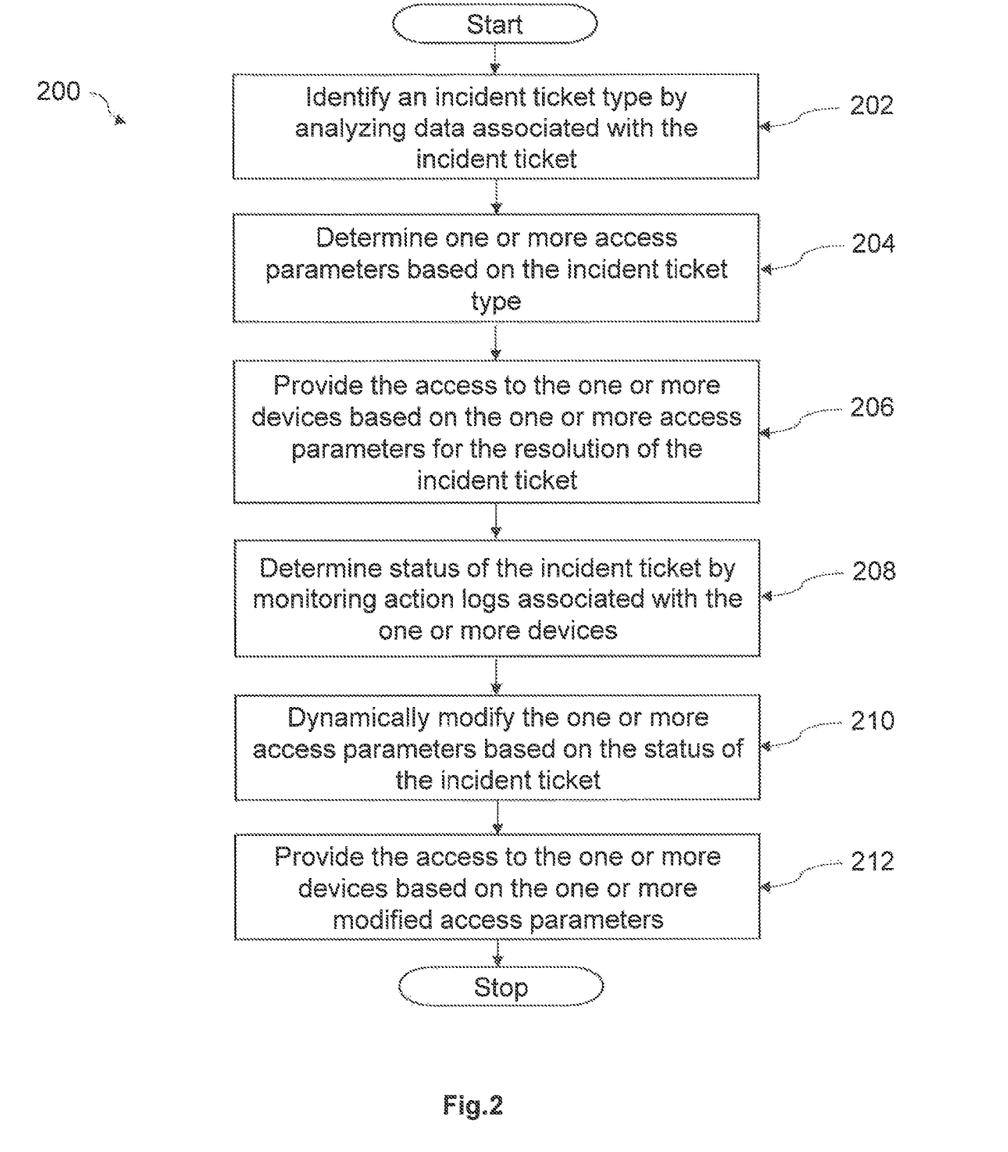
FIG. 2 is a flow diagram illustrating a method for dynamically managing access to one or more devices for resolution of an incident ticket associated with the one or more devices in accordance with some embodiments of the present disclosure.
Figure 3:
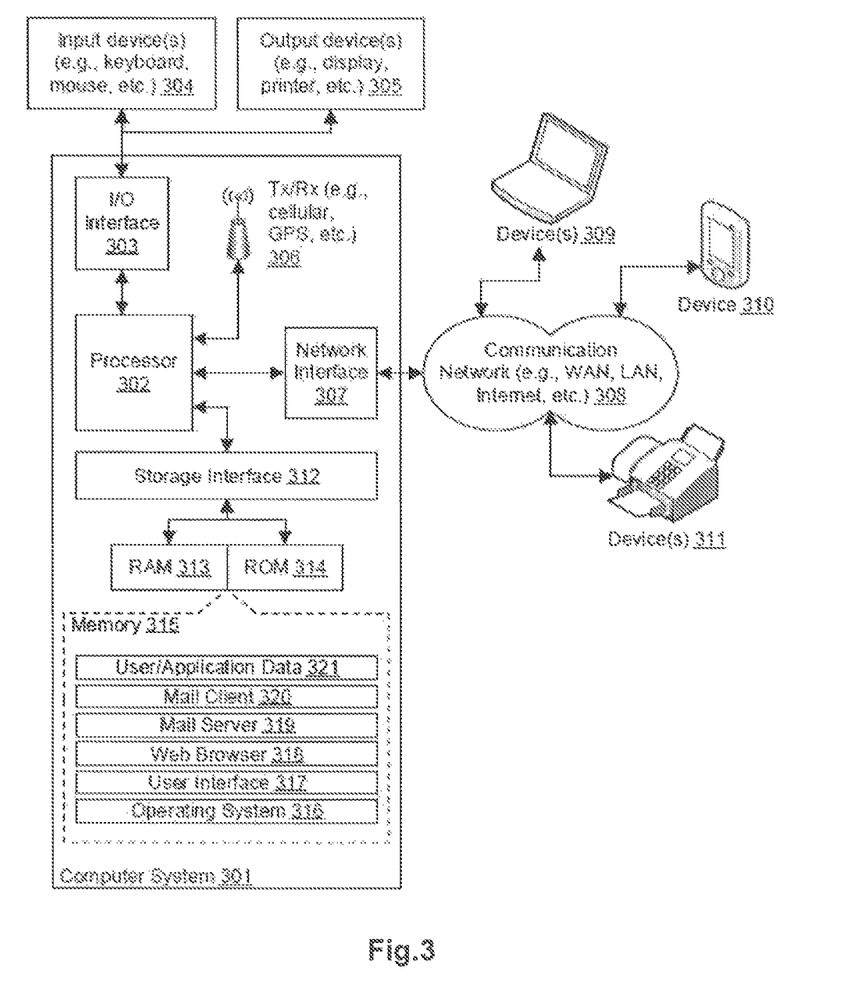
FIG. 3 is a block diagram of an exemplary computer system for implementing embodiments consistent with the present disclosure.

Working of the systems and methods for dynamically managing access to one or more devices for resolution of an incident ticket associated with the one or more devices is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network implementation 100 comprising an access management system 102 for dynamically managing access to one or more devices according to some embodiments of the present disclosure. As shown in the FIG. 1, the access management system 102 is communicatively coupled to one or more devices ($104_1$, $104_2$, ... $104_n$), an incident ticket type database 106, and an incident ticketing database 108. Hereinafter the numeral '104' may be used in place of '($104_1$, $104_2$, ... $104_n$)' to indicate a device, devices, or one or more devices. A device 104 of the one or more devices 104 may be, but is not limited to, a laptop, a desktop, a proxy server, a commerce server, a terminal server, a file server, a web server, a communication server, a mail server, a database server, and an application server. Hereinafter the terms "one or more devices" and 'devices' may be referred alternatively.

In one implementation, the incident ticket type database 106 and the incident ticketing database 108 may be present within the access management system 102. The incident ticket type database 106 may comprise a plurality of incident ticket types. Each incident ticket type may be mapped to a device type affected by an incident ticket and at least one of an application software run on the device and a system software run on the device. The application software and the system software may be affected by the incident ticket. The incident ticket type may also be mapped to a security privilege to access the device and time duration to access the device.

The incident ticketing database 108 may comprise one or more incident tickets. The one or more incident tickets may be open incident tickets, pending incident tickets, closed incident tickets, or resolved incident tickets.

The access management system 102 may be communicatively coupled to the devices 104, the incident ticket type database 106, and the incident ticketing database 108 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in the FIG. 1, the access management system 102 comprises a processor 110, a memory 112 coupled to the processor 110, and input/output (I/O) interface(s) 114. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions stored in the memory 112. The memory 112 can include any non-transitory computer-readable medium known in the art including, for example, volatile memory (e.g., RAM), and/or non-volatile memory (e.g., EPROM, flash memory, etc.).

The I/O interface(s) 114 may include a variety of software and hardware interfaces, for example, a web interface, a graphical user interface, etc., allowing the access management system 102 to interact with the devices 104, the incident ticket type database 106, and the incident ticketing database 108. Further, the I/O interface(s) 114 may enable the access management system 102 to communicate with other computing devices. The I/O interface(s) 114 can facilitate multiple communications within a wide variety of networks and protocol types, including wired networks, for example LAN, cable, etc., and wireless networks such as WLAN, cellular, or satellite. The I/O interface(s) 114 may include one or more ports for connecting a number of devices to each other or to another server.

In one implementation, the memory 112 includes modules 116 and data 118. In one example, the modules 116, amongst other things, include routines, programs, objects, components, and data structures, which perform particular tasks or implement particular abstract data types. The modules 116 and may also be implemented as, signal processor(s), state machine(s), logic circuitries, and/or any other device or component that manipulate signals based on operational instructions. Further, the modules 116 can be implemented by one or more hardware components, by computer-readable instructions executed by a processing unit, or by a combination thereof.

In one implementation, the data 118 serves, amongst other things, as a repository for storing data fetched, processed, received and generated by one or more of the modules 112. In one implementation, the data 118 may include incident ticket data 128 (data associated with the incident ticket) and action logs 130. In one embodiment, the data 118 may be stored in the memory 112 in the form of various data structures. Additionally, the aforementioned data can be organized using data models, such as relational or hierarchical data models. In an example, the data 118 may also comprise other data used to store data, including temporary data and temporary files, generated by the modules 116 for performing the various functions of the access management system 102.

In one implementation, the modules 116 further include an identifying module 120, a determining module 122, an access module 124, and a status determining module 126. In an example, the modules 116 may also comprise other modules. The other modules may perform various miscellaneous functionalities of the access management system 102. It will be appreciated that such aforementioned modules may be represented as a single module or a combination of different modules.

In order to dynamically manage access to one or more devices 104 for the resolution of the incident ticket, the identifying module 120 may identify an incident ticket type by analyzing data associated with the incident ticket. The data associated with the incident ticket may comprise, but is not limited to, incident ticket description, one or more devices 104 affected by the incident ticket, an application software affected by the incident ticket, and a system software affected by the Incident ticket. The application software and the system software may be executed or run on the one or more devices 104.

To identify the incident ticket type for the incident ticket, the identifying module 120 may compute a semantic similarity between the incident ticket description and the incident ticket descriptions stored as part of different incident ticket types in the incident ticket type database 106. In order to compute the semantic similarity, matching may be performed based on semantic meaning of the incident ticket description of the incident ticket. In one example, if the incident ticket description is "receiving error on Outlook that—unable to retrieve the data", then a semantic matching may be performed with the incident ticket descriptions corresponding to different incident ticket types stored in the incident ticket type database 106. Thus, for the incident ticket description "receiving error on Outlook that—unable to retrieve the data", the incident type identified may be "Upgrading the outlook with latest patch".

Similarly, incident ticket descriptions for which the incident ticket type "Upgrading the outlook with latest patch" may be identified may include, "not able to send mails to external domain", "Outlook is trying to connecting Wrong Exchange server while opening", "not able to send mails in Outlook Express but able to receive", "getting frequently credential popup", "getting error message while opening the outlook", "not able to send and receive mails", and "Outlook is not prompting for credentials—module-outlook". The incident tickets corresponding to each of the incident ticket descriptions may be grouped under the incident ticket type, "Upgrading the outlook with latest patch".

In another example, if the incident ticket description is "Internet Explorer (IE) proxy settings getting disabled intermittently and updating the policy had resolved the issue at that moment", the incident ticket type corresponding to the incident ticket description may be identified as "Reconfiguring the location proxy". Similarly, the incident ticket descriptions for which the incident ticket type "Reconfiguring the location proxy" may be identified may include "while accessing internet user is not prompted for proxy authentication, "intermittent slowness while accessing internet through proxy server", "users are not able to access the internet", "users able to access internet by bypassing proxy", "access to the internet server from internal host not working", and "while accessing internet through the proxy server, sites are opening slowly—module-browser".

After identifying the incident ticket type, the determining module 122 may determine one or more access parameters based on the incident ticket type. The one or more access parameters may comprise, but is not limited to, a device type, an application software run on a device, a system software run on a device, a security privilege to access the device, and time duration to access the device. The application software run on the device may include scripts, commands, browser, databases, spreadsheets, or the like. The system software run on the device may include specific modules such as Outlook, assembler, debugger, compilers, Operating System, or the like.

In one implementation, the determining module 122 may determine the application software run on the device or the system software run on the device, affected by the incident ticket by analyzing the incident ticket description. For example, if the incident ticket description is "Outlook is not prompting for credentials—module-outlook", the system software run on the device may be identified as 'Outlook'. In another example, if the incident ticket description is "while accessing internet through the proxy server, sites are opening slowly—module-browser", the application software run on the device may be identified as 'browser'.

In one implementation, the determining module 122 may determine the one or more access parameters by retrieving the one or more access parameters corresponding to the incident ticket type from the incident ticket type database 106. The incident ticket type database 106 stores access parameters mapped to each incident ticket type. In one example, the incident ticket type may be "Reconfiguring the location proxy". The one or more access parameters including the device type may be a laptop or a desktop. The security privilege to access the device may be "admin level" and the time duration to access the laptop or the desktop may be "10 hours". The application software to be accessed may be determined as 'browser'.

In another example, if the incident ticket type is "Upgrading the outlook with latest patch", the one or more access parameters corresponding to the incident ticket type may be retrieved from the incident ticket type database 106. The device type may be determined as a laptop or a desktop. The security privilege may be determined as "admin level" and the time duration to access the laptop or the desktop may be determined as 5 hours. The system software to be accessed may be determined as 'Outlook'.

In one implementation, the one or more access parameters for each incident ticket type may be determined based on action logs 130 of the one or more devices 104. The action logs 130 may be obtained by monitoring actions performed on an application software or a system software in a device 104, time duration required to perform the actions for resolving the incident ticket, and the security privilege at which the action is performed for resolution of the incident ticket corresponding to the incident ticket type. The action logs 130 for each device 104 may be analyzed to obtain the one or more access parameters for each incident ticket type. For example, the action logs 130 may be analyzed to obtain the device type and the application software or the system software which is accessed the maximum number of times to resolve the incident ticket. In addition, the action logs 130 may be analyzed to obtain the security privilege which is used to access the devices 104 the maximum number of times for resolving the incident ticket. Also, the action logs 130 may be analyzed to compute an average of the time duration required to perform the actions for resolving the incident ticket to obtain the time duration to access the device 104.

In one implementation, the actions performed on the one or more devices 104 may be monitored by a remote action monitoring module installed on each device 104 of the one or more devices 104. The action logs 130 may be further transferred to the memory 112 of the access management system 102.

Upon determining the one or more access parameters based on the incident ticket type, the access module 124 may provide access to the one or more devices 104 based on the one or more access parameters for the resolution of the incident ticket. For example, consider that the incident ticket type is "upgrading the outlook with latest patch" and the incident ticket description corresponding to the incident ticket is "receiving error on Outlook that unable to retrieve the data". For the incident ticket type, the "device type may be determined as one or more desktops, the system software run on the device may be determined as 'Outlook', the security privilege to access the device may be determined as 'admin' and the time duration to access the device may be determined as '10 hours'. The access module 124 may provide access to 'Outlook' in the one or more desktops at admin level for 10 hours.

In one implementation, the access module 124 may provide access to an agent assigned for the resolution of the incident ticket. The agent assigned for the resolution of the incident ticket may be identified based on at least one of an agent performance score, availability of the agent, and the incident ticket type. The agent performance score may be computed based on one or more performance parameters. The one or more performance parameters may include, but is not limited to, number of incident tickets resolved by an agent for an incident ticket type, the number of high priority incident tickets resolved by the agent, the number of high severity incident tickets resolved by the agent, the number of incident tickets transferred to another agent within same incident ticket type, the number of incident tickets transferred from another agent within same incident ticket type, the number of incident tickets closed by the agent which were subsequently re-opened, the time taken for closing each incident ticket in the incident ticket type, the number of times the incident ticket is closed before average closure time for the incident ticket type, the number of times the incident ticket is closed after average closure time for the incident ticket type, and the user rating for each incident ticket closed by the agent. The agent performance score may be computed based on a weighted average of values of the one or more performance parameters. The agent performance score may vary between '0' and '1'. The agent performance score of '1' may indicate a highly skilled agent whereas a lower skilled agent may be given a lower agent performance score for a particular incident ticket type.

In addition to the agent performance score and the incident ticket type, the availability of the agent may be used to identify the agent for resolving the incident ticket. For example, consider that the agent performance score of agent 'A' is '0.9', the agent performance score of agent 'B' is '0.8', and the agent performance score of agent 'C' is '0.7'. If the agent 'A' is unavailable for resolving the incident ticket and the agent 'B' and agent 'C' are available for resolving the incident ticket, the agent 'B' may be identified for resolving the incident ticket. Upon identifying the agent, the access module 124 may provide access to the agent 'A' for accessing the one or more devices 104.

After providing the access to the one or more devices 103, the status determining module 126 may determine status of the incident ticket by monitoring action logs 130 associated with the one or more devices 104. The action logs 130 may be monitored after a pre-defined time interval to check if the incident ticket is resolved. The action logs 130 may comprise actions performed on the application software or system software to resolve the incident ticket. If the action is incomplete the status of the incident ticket may be determined as active. On the other hand, if the action is complete, the status of the incident ticket may be determined as 'closed'. In one implementation, incident ticket data 128 retrieved from the incident ticket database 108 may be analyzed to determine the status of the incident ticket.

Upon determining the status of the incident ticket, the access module 124 may dynamically modify the one or more access parameters based on the status of the incident ticket. In one implementation, the time duration to access the device may be modified dynamically when the status of the incident ticket is active. In one example, if the status of the incident ticket is active and the time duration for which the resolution is ongoing is more than the time duration to access the device, the time duration to access the device may be increased dynamically to enable the resolution of the incident ticket.

In one implementation, the security privilege to access the device may be extended when the status of the incident ticket is active. In one example, if the status of the incident ticket is active and the time duration for which the resolution is ongoing is more than the time duration to access the device, the security privilege to access the device 104 may be extended dynamically for the increased time duration to access the device.

In one implementation, the security privilege to access the device may be revoked dynamically when the status of the incident ticket is closed. In one example, if the incident ticket is resolved before the time duration to access the device expires, the security privilege to access the device 104 may be dynamically revoked.

Upon dynamically modifying the access parameters, the access module 124 may provide the access to the one or more devices 104 based on the one or more modified access parameters. For example, the agent may be provided access to the one or more devices 104 with extended security privilege and for the increased time duration.

FIG. 2 is a flow diagram illustrating a method 200 for dynamically managing access to one or more devices 104 for resolution of an incident ticket associated with the one or more devices 104 in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202, an incident ticket type may be identified by analyzing data associated with the incident ticket. The data associated with the incident ticket may comprise, but is not limited to, incident ticket description, one or more devices 104 affected by the incident ticket, an application software affected by the incident ticket, and a system software affected by the incident ticket. The application software and the system software may be executed or run on the one or more devices 104. The identifying of the incident ticket type may be explained in detail in conjunction with the FIG. 1.

At block 204, one or more access parameters may be determined based on the incident ticket type. The one or more access parameters may comprise, but is not limited to, a device type, an application software run on a device, a system software run on a device, a security privilege to access the device, and time duration to access the device. The application software run on the device may include scripts, commands, browser, databases, spreadsheets, or the like. The system software run on the device may include specific modules such as Outlook, assembler, debugger, compilers, Operating System, or the like. The determining of the one or more access parameters may be explained in detail in conjunction with the FIG. 1.

At block 206, the access may be provided to the one or more devices 104 based on the one or more access parameters for the resolution of the incident ticket. In one implementation, the access module 124 may provide access to an agent assigned for the resolution of the incident ticket. The agent assigned for the resolution of the incident ticket may be identified based on at least one of an agent performance score, availability of the agent, and the incident ticket type. The agent performance score may be computed based on one or more performance parameters. The providing of the access to the one or more devices 104 may be explained in detail in conjunction with the FIG. 1.

At block 208, status of the incident ticket may be determined by monitoring action logs 130 associated with the one or more devices 104. The action logs 130 may be monitored after a pre-defined time interval to check if the incident ticket is resolved. The action logs 130 may comprise actions performed on the application software or system software to resolve the incident ticket. If the action is incomplete the status of the incident ticket may be determined as active. On the other hand, if the action is complete, the status of the incident ticket may be determined as 'closed'. The determining of the status may be explained in detail in conjunction with the FIG. 1.

At block 210, the one or more access parameters may be dynamically modified based on the status of the incident ticket. In one implementation, the dynamically modifying the one or more access parameters may comprise modifying the time duration to access the device when the status of the incident ticket is active.

In one implementation, the dynamically modifying the one or more access parameters may comprise extending the security privilege to access the device when the status of the incident ticket is active. In one implementation, the dynamically modifying the one or more access parameters may comprise revoking the security privilege to access the device when the status of the incident ticket is closed. The dynamically modifying the one or more access parameters based on the status of the incident ticket may be explained in detail in conjunction with the FIG. 1.

At block 212, the access may be provided to the one or more devices 104 based on the one or more modified access parameters. The providing access to the one or more devices may be explained in detail in conjunction with the FIG. 1

The access management system 102 and the method disclosed herein dynamically manages the access to devices 104. As the access is managed dynamically for the resolution of the incident ticket, the time required for the resolution of the incident ticket is less. Moreover, the dynamic modification in the time duration to access the device 104 based on the incident ticket status ensures speedy resolution of the incident ticket. Also, the dynamic modification in the security privilege to access the devices 104 avoids any security concerns which may arise due to continued access to the devices 104 after the resolution of the incident ticket.

Computer System

FIG. 3 is a block diagram of an exemplary computer system for implementing embodiments consistent with the present disclosure. Variations of computer system 301 may be used for implementing the identifying module 120, the determining module 122, the access module 124, and the status determining module 126. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for dynamically managing access to one or more devices for the resolution of the incident ticket. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for dynamically managing access to one or more devices for resolution of an incident ticket associated with the one or more devices, the method comprising:
    identifying, by an access management system, an incident ticket type by analyzing data associated with the incident ticket;
    determining, by the access management system, one or more access parameters based on the incident ticket type, wherein the one or more access parameters comprises a device type affected by the incident ticket, an application software run on a device affected by the incident ticket, a system software run on a device, a security privilege to access the device, and time duration to access the device;
    providing, by the access management system, the access to the one or more devices based on the one or more access parameters for the resolution of the incident ticket;
    dynamically modifying, by the access management system, the one or more access parameters, wherein the dynamically modifying comprises modifying the time duration to access the device when a status of the incident ticket is active;
    determining, by the access management system, the status of the incident ticket by monitoring action logs associated with the one or more devices after a pre-defined time interval for actions performed on the application software to determine whether the ticket has been resolved;
    dynamically modifying, by the access management system, the one or more access parameters based on the resolved status of the incident ticket; and
    providing, by the access management system, the access to the one or more devices based on the one or more modified access parameters.

2. The method of claim 1, wherein the dynamically modifying the one or more access parameters comprises extending the security privilege to access the device when the status of the incident ticket is active.

3. The method of claim 1, wherein the dynamically modifying the one or more access parameters comprises revoking the security privilege to access the device when the status of the incident ticket is closed.

4. The method of claim 1, wherein the access to the one or more devices is provided to an agent assigned for the resolution of the incident ticket.

5. The method of claim 4, wherein the agent assigned for the resolution of the incident ticket is identified based on at least one of an agent performance score, availability of the agent, and the incident ticket type.

6. An access management system for dynamically managing access to one or more devices for resolution of an incident ticket associated with the one or more devices, the access management system comprising:
    a processor; and
    a memory communicatively coupled to the processor, wherein the memory stores processor instructions, which, on execution, causes the processor to:
    identify an incident ticket type by analyzing data associated with the incident ticket;
    determine one or more access parameters based on the incident ticket type, wherein the one or more access parameters comprises a device type affected by the incident ticket, an application software run on a device affected by the incident ticket, a system software run on a device, a security privilege to access the device, and time duration to access the device;
    provide the access to the one or more devices based on the one or more access parameters for the resolution of the incident ticket;
    dynamically modify the one or more access parameters, wherein the dynamically modifying comprises modifying the time duration to access the device when a status of the incident ticket is active;
    determine the status of the incident ticket by monitoring action logs associated with the one or more devices after a pre-defined time interval for actions performed on the application software to determine whether the ticket has been resolved;
    dynamically modify the one or more access parameters based on the resolved status of the incident ticket; and
    provide the access to the one or more devices based on the one or more modified access parameters.

7. The access management system of claim 6, wherein the processor is caused to extend the security privilege to access the device when the status of the incident ticket is active to dynamically modify the one or more access parameters.

8. The access management system of claim 6, wherein the processor is caused to revoke the security privilege to access the device when the status of the incident ticket is closed to dynamically modify the one or more access parameters.

9. The access management system of claim 6, wherein the access to the one or more devices is provided to an agent assigned for the resolution of the incident ticket.

10. The access management system of claim 9, wherein the agent assigned for the resolution of the incident ticket is identified based on at least one of an agent performance score, availability of the agent, and the incident ticket type.

11. A non-transitory computer-readable medium storing instructions executable by a hardware processor for:
    identifying, via the hardware processor, an incident ticket type by analyzing data associated with the incident ticket;
    determining, via the hardware processor, one or more access parameters based on the incident ticket type, wherein the one or more access parameters comprises a device type affected by the incident ticket, an application software run on a device affected by the incident ticket, a system software run on a device, a security privilege to access the device, and time duration to access the device;
    providing, via the hardware processor, the access to the one or more devices based on the one or more access parameters for the resolution of the incident ticket;
    dynamically modifying, via the hardware processor, the one or more access parameters, wherein the dynamically modifying comprises modifying the time duration to access the device when a status of the incident ticket is active;

determining, via the hardware processor, the status of the incident ticket by monitoring action logs associated with the one or more devices after a pre-defined time interval for actions performed on the application software to determine whether the ticket has been resolved;

dynamically modifying, via the hardware processor, the one or more access parameters based on the resolved status of the incident ticket; and providing, via the hardware processor, the access to the one or more devices based on the one or more modified access parameters.

12. The medium of claim 11, wherein dynamically modifying, via the hardware processor, the one or more access parameters comprises extending the security privilege to access the device when the status of the incident ticket is active.

13. The medium of claim 11, wherein dynamically modifying, via the hardware processor, the one or more access parameters comprises revoking the security privilege to access the device when the status of the incident ticket is closed.

14. The medium of claim 11, wherein the access to the one or more devices is provided to an agent assigned for the resolution of the incident ticket.

* * * * *